US008967967B2

(12) United States Patent
Stretton et al.

(10) Patent No.: US 8,967,967 B2
(45) Date of Patent: Mar. 3, 2015

(54) PROPFAN ENGINE

(75) Inventors: Richard G. Stretton, Loughborough (GB); Nicholas Howarth, Derby (GB)

(73) Assignee: Rolls-Royce PLC, London (GB)

( * ) Notice: Subject to any disclaimer, the term of this patent is extended or adjusted under 35 U.S.C. 154(b) by 593 days.

(21) Appl. No.: 13/359,194

(22) Filed: Jan. 26, 2012

(65) Prior Publication Data

US 2013/0343892 A1    Dec. 26, 2013

(30) Foreign Application Priority Data

Feb. 22, 2011    (GB) .................................... 1102987.3

(51) Int. Cl.
| F01D 5/02 | (2006.01) |
| F02K 3/072 | (2006.01) |
| B64C 11/48 | (2006.01) |
| B64D 29/00 | (2006.01) |
| B64D 27/00 | (2006.01) |

(52) U.S. Cl.
CPC ............... *F01D 5/022* (2013.01); *F02K 3/072* (2013.01); *F05D 2240/14* (2013.01); *F05D 2250/70* (2013.01); *Y02T 50/671* (2013.01); *B64C 11/48* (2013.01); *B64D 29/00* (2013.01); *B64D 2027/005* (2013.01); *Y02T 50/66* (2013.01)
USPC ...... 416/90 A; 416/129; 416/198 A; 415/103; 415/207; 415/218.1; 415/222

(58) Field of Classification Search
USPC .............. 415/101, 103, 207, 218.1, 220, 222; 416/90 A, 124, 129, 198 R, 198 A
See application file for complete search history.

(56) References Cited

U.S. PATENT DOCUMENTS

| 4,765,135 A | 8/1988 | Lardellier |
| 4,936,746 A * | 6/1990 | Mayo et al. ..................... 416/46 |
| 4,976,102 A * | 12/1990 | Taylor ........................... 416/129 |
| 7,581,694 B2 * | 9/2009 | Guering ........................ 244/53 B |
| 7,926,760 B2 * | 4/2011 | Gall et al. ........................ 244/55 |
| 7,966,833 B2 * | 6/2011 | Beutin et al. .................... 60/802 |
| 8,011,613 B2 * | 9/2011 | Belleville ....................... 244/1 N |
| 2010/0155526 A1 | 6/2010 | Negulescu |

FOREIGN PATENT DOCUMENTS

| EP | 0 363 997 A2 | 4/1990 |
| GB | 2 138 507 A | 10/1984 |
| GB | 2 211 247 A | 6/1989 |
| GB | 2 254 661 A | 10/1992 |
| GB | 2467208 A | 7/2010 |
| WO | WO 2010/055224 A1 | 5/2010 |

OTHER PUBLICATIONS

Jun. 8, 2011 Search Report issued in Application No. GB1102987.3.

* cited by examiner

*Primary Examiner* — Igor Kershteyn
(74) *Attorney, Agent, or Firm* — Oliff PLC

(57) ABSTRACT

The present disclosure relates to a propfan engine comprising: one or more rotor stages comprising a plurality of rotors; and an outer wall comprising an outer profile, at least a portion of the outer profile defining a substantially circular cross-section, wherein the diameter of the substantially circular cross-section increases in the direction of flow over the outer wall and downstream of a leading edge of the rotors, and the diameter increases at substantially all points defining the circumference of the substantially circular cross-section.

17 Claims, 3 Drawing Sheets

PROPFAN ENGINE

The present disclosure relates to a propfan engine and particularly but not exclusively relates to a propfan engine with a contoured outer casing.

BACKGROUND

Referring to FIG. 1, a conventional twin-spooled, contra-rotating propeller gas turbine engine, e.g. a propfan engine, is generally indicated at 10 and has a principal rotational axis 9. The term "propfan" will be understood by the skilled person to refer to a gas turbine engine having an open rotor, i.e. having a rotor comprising blades that are not surrounded by a nacelle. The engine 10 comprises a core engine 11 having, in axial flow series, an air intake 12, a low pressure compressor 14, a high-pressure compressor 15, combustion equipment 16, a high-pressure turbine 17, a low pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26. The configuration having the propeller stages 23, 24 towards the rear of the gas turbine engine 10 is termed a "pusher" configuration, as opposed to the "puller" or "tractor" configuration having the propeller stages 23, 24 towards the front of the engine 10.

The gas turbine engine 10 works in a conventional manner so that air entering the intake 12 is accelerated and compressed by the low pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, low pressure and free power turbines 17, 18, 19 before being exhausted through the nozzle 20 to provide some propulsive thrust. The high-pressure, intermediate pressure and free power turbines 17, 18, 19 respectively drive the high and low pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

One problem with a conventional pusher propeller gas turbine engine 10 is that its cruise speed is limited to slightly below transonic, predominantly due to the drag rise encountered when flying at higher speeds. One of the main causes of this drag rise is that generally the root of each blade forming the propeller stages 23, 24 can not be shaped with the thin profiles required for high speed. The root has to be thick enough to guarantee the structural robustness of the blades given the high aerodynamic and mechanical loads acting on the propeller stages 23, 24, which disadvantageously adds significant weight to the engine 10. The airflow passing between the blade roots may easily become supersonic if the propeller gas turbine engine 10 operates at transonic cruise speed, around Mach 0.8. This results in disadvantageous increased noise, aerodynamic losses and possible mechanical excitation, phenomena which it is desirable to avoid or at least limit.

The example shown in FIG. 1 has a nacelle 21 with a conventional fore-body extending from the intake 12 to a point at which the nacelle diameter is at a maximum. In an alternative configuration, for example, the General Electric GE36 Unducted Fan, there is then a reduction in the nacelle diameter downstream of the maximum diameter point and ahead of the first propeller stage. In effect the geometry results in a diffusion upstream of the first propeller stage such that the flow velocity is reduced. The annulus line through the propeller stages of the GE36 is then close to cylindrical and is followed by a short curved after-body to close out at the core exhaust nozzle. By diffusing the flow ahead of the first propeller stage, the Mach number of the flow at the hub of the GE36 may be reduced and the rotor efficiency may benefit as a result. However, due to the large maximum nacelle diameter of the GE36 required to achieve the diffusion, a large free-stream over-speed over the outer span of the propeller blades occurs and this is detrimental to the rotor efficiency.

The present disclosure therefore seeks to address these issues.

STATEMENTS OF INVENTION

According to a first aspect of the present invention there is provided a propfan engine comprising: one or more rotor stages comprising a plurality of rotors; and an outer wall comprising an outer profile, at least a portion of the outer profile defining a substantially circular cross-section, wherein the diameter of the substantially circular cross-section increases in the direction of flow over the outer wall and downstream of a leading edge of the rotors, and the diameter increases at substantially all points defining the circumference of the substantially circular cross-section.

The diameter may increase at an increasing rate in a first part of the portion of the outer profile. For example, the first part of the portion of the outer profile may be at least partially concave, e.g. with respect to the longitudinal axis. The diameter may increase at a decreasing rate in a second part of the portion of the outer profile. For example, the second part of the portion of the outer profile may be at least partially convex, e.g. with respect to the longitudinal axis. The second part may be downstream of the first part of the portion of the outer profile. There may be a point of inflection in the outer profile between the first and second parts of the portion of the outer profile. The radius of curvature in the first part of the portion of the outer profile may be substantially 20% of a maximum diameter of the propfan outer wall. The radius of curvature in the second part of the portion of the outer profile may be substantially 40% of the maximum diameter of the propfan outer wall.

In a third part of the portion of the outer profile the diameter of the substantially circular cross-section may reduce in the direction of flow over the outer wall. For example, the third part of the portion of the outer profile may be at least partially convex, e.g. with respect to the longitudinal axis. The third part may be downstream of the first part and/or the second part of the portion of the outer profile. There may be a local maximum in the cross-section diameter in the outer profile between the third part and the first and/or second parts of the portion of the outer profile. The radius of the curvature of the second and/or third parts of the portion of the outer profile may be substantially 40% of a maximum diameter of the propfan outer wall. The radius of the curvature of the second and/or third parts of the portion of the outer profile may be in the range of substantially 40% to substantially 130% of a maximum diameter of the propfan outer wall. The radius of the curvature of the second and/or third parts of the portion of the outer profile may be greater than 130% of a maximum diameter of the propfan outer wall. There may be a local minimum in the cross-section diameter in the outer profile between the leading edge of the rotors and the local maximum.

The diameter may start increasing at a point upstream of a trailing edge of the rotors.

A cross-section of the outer profile may comprise a maximum diameter at a point upstream of a leading edge of the rotors. The diameter may reduce between the maximum diameter and the leading edge of the rotors. The outer profile may comprise a point of inflection between the maximum diameter and the leading edge of the rotors.

The propfan engine may comprise a first rotor stage and a second rotor stage. Each rotor stage may have associated with it an increase in the diameter of the substantially circular cross-section downstream of the respective rotor leading edges. The second rotor stage may be downstream of the first rotor stage. There may be a reduction in the diameter of the cross-section between the increased diameter of the first rotor stage and the increased diameter of the second rotor stage.

In a first embodiment for a pusher configuration with the rotors located towards the rear of the engine, the profile of the substantially circular cross section portion may have an average gradient of between 6° and 9° with respect to the longitudinal axis between the local minimum and the local maximum, and preferably may have an average gradient of substantially 7.5°. The increase in diameter of the substantially circular cross section portion from the local minimum to the local maximum may be between 4% and 6% of the maximum diameter.

In a second embodiment for a puller configuration with the rotors towards the front of the engine, the profile of the substantially circular cross section portion may have a gradient of between 10° and 12° with respect to the longitudinal axis between the local minimum and the local maximum, and may have an average gradient of substantially 11°. The increase in diameter of the substantially circular cross section portion between the local minimum and the local maximum may be between 11% and 13% of the maximum diameter.

According to a second aspect of the present invention there is provided a propfan engine comprising: one or more rotor stages comprising a plurality of rotors; and an outer wall comprising an outer profile, the outer profile defining a cross-section, wherein the cross-section of the outer profile comprises a maximum diameter at a point upstream of a leading edge of the rotors, the diameter reducing between the maximum diameter and the leading edge of the rotors, and wherein the outer profile comprises a point of inflection between the maximum diameter and the leading edge of the rotors.

The maximum diameter may be an overall maximum diameter or may be a local maximum diameter, which may be different from overall maximum diameter.

The reduction in the diameter between the maximum diameter and the leading edge of the rotors may finish substantially in line with the leading edge of the rotors.

The cross-section may be substantially circular. The diameter may reduce at substantially all points defining the circumference of the substantially circular cross-section.

A first part of the reduction in the diameter between the maximum diameter and the leading edge of the rotors may reduce at an increasing rate. For example, the first part may be at least partially convex, e.g. with respect to the longitudinal axis. The first part of the reduction in the diameter between the maximum diameter and the leading edge of the rotors may comprise a radius of curvature substantially 130% of the maximum diameter of the propfan outer wall.

A second part of the reduction in the diameter between the maximum diameter and the leading edge of the rotors may reduce at a decreasing rate. For example, the second part may be at least partially concave, e.g. with respect to the longitudinal axis. The second part of the reduction in the diameter between the maximum diameter and the leading edge of the rotors may comprise a radius of curvature substantially 25% of the maximum diameter of the propfan outer wall.

The second part may be downstream of the first part of the reduction in the diameter between the maximum diameter and the leading edge of the rotors. There may be a point of inflection in the outer profile between the first and second parts of the reduction in the diameter between the maximum diameter and the leading edge of the rotors.

The outer wall may define the outer profile. The outer wall, at least in part, may form a body of revolution about a longitudinal axis. The cross-section may be perpendicular to the longitudinal axis.

The propfan engine may comprise a pusher or puller configuration, i.e., the rotor stages may be towards the rear or front of the propfan engine respectively.

The outer profile may comprise a local minimum diameter, which may be located downstream of the leading edge of the blade.

In a first embodiment for a pusher configuration with the rotors towards the rear of the engine, the outer profile between the maximum diameter and the local minimum diameter may have an average gradient of between 5° and 9° with respect to the longitudinal axis, and preferably may have an average gradient of substantially 6°. The reduction in diameter of the outer profile from the maximum diameter to the local minimum diameter may be between 7% and 9% of the maximum diameter and may preferably be substantially 8% of the maximum diameter.

In a second embodiment for a puller configuration with the rotors towards the front of the engine, the outer profile between the maximum diameter and the local minimum diameter may have an average gradient of between 5° and 9° with respect to the longitudinal axis, and preferably may have an average gradient of substantially 6°. The reduction in diameter of the outer profile from the maximum diameter to the local minimum may be between 6% and 8% of the maximum diameter and may preferably be 7% of the maximum diameter.

The present disclosure may relate to nacelle contours local to the rotors. In particular, the contours may provide a greater reduction in the hub Mach number compared to the prior art and may alleviate root choke concerns. The contours may also minimise any increase to the nacelle maximum diameter ahead of the rotors, thus helping to reduce the free stream Mach number at the rotor tip and benefiting the rotor efficiency.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
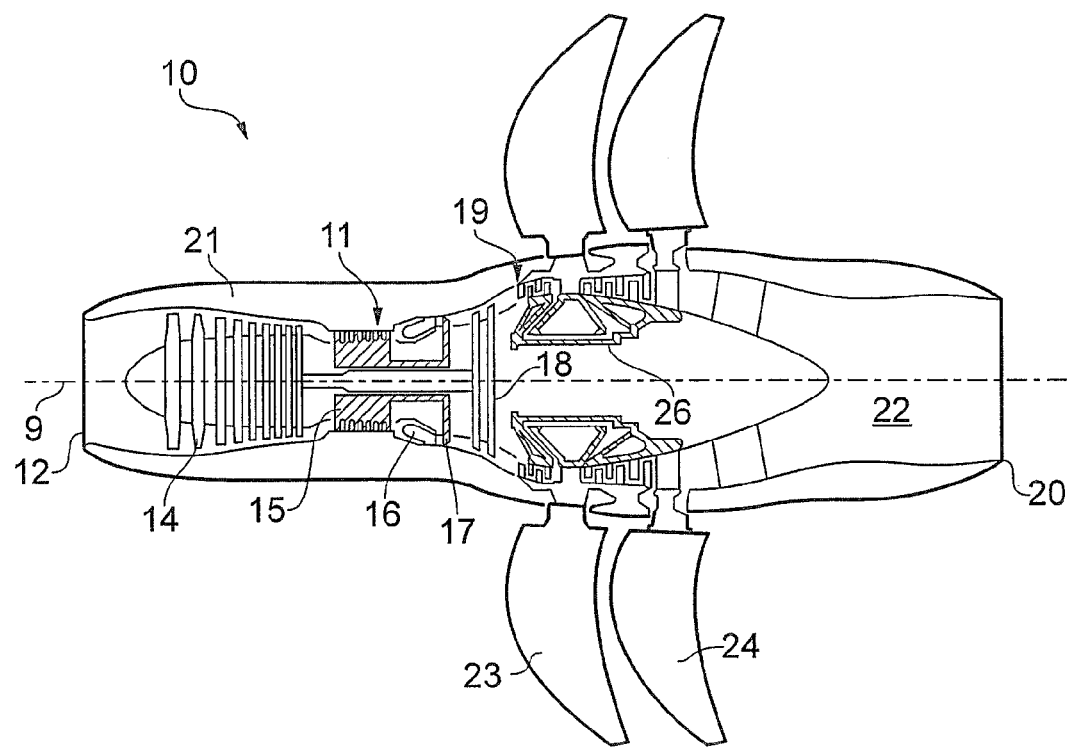
FIG. 1 shows a previously-proposed nacelle for a propeller gas turbine engine.
Figure 2A:
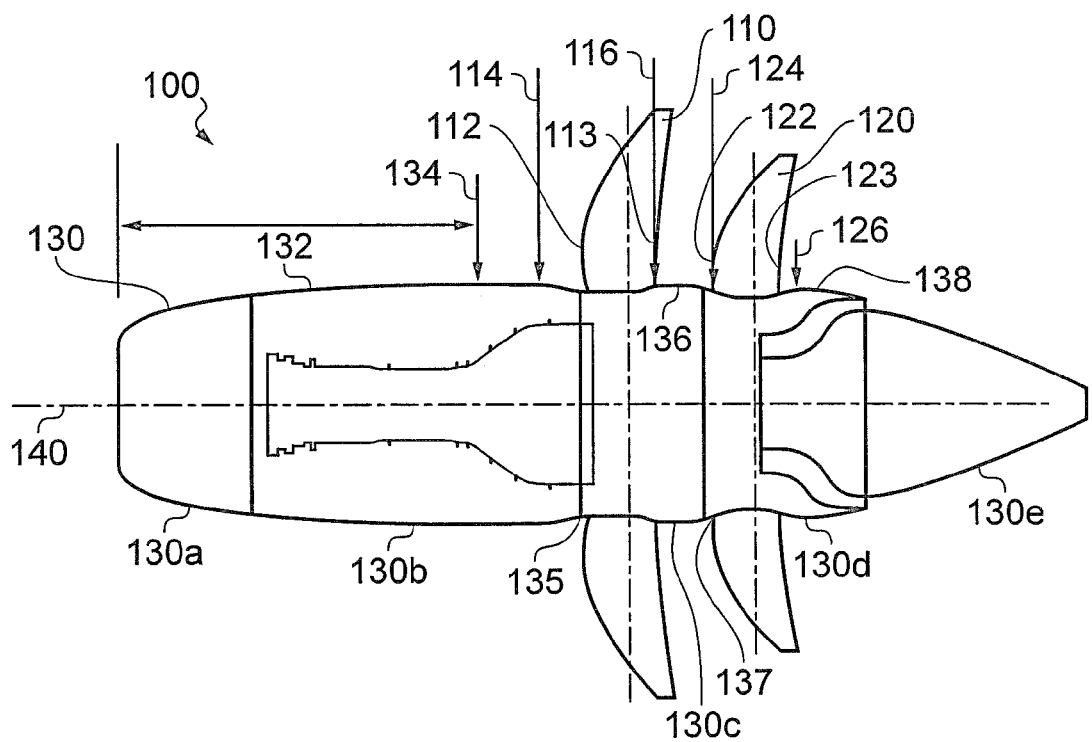
FIGS. 2(a) and 2(b) show a sectional view of a diffusive nacelle according to an example of the present disclosure.
Figure 2B:
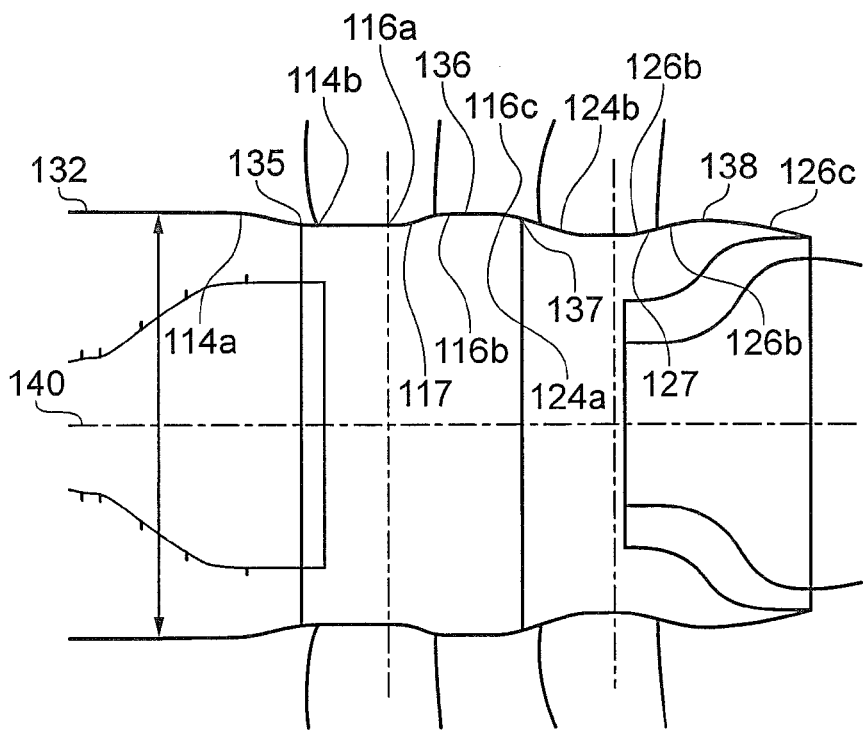

With reference to FIGS. 2(a) and 2(b), a propfan engine 100, e.g. an unducted turbofan engine, according to an example of the present disclosure, may comprise first and second rotor stages 110, 120 each comprising a plurality of rotors. As shown, the propfan engine may be a pusher type, e.g. the first and second rotor stages 110, 120 may be towards the rear of the engine. However, in an alternative configuration the propfan engine may be a puller type, e.g. the first and second rotor stages may be towards the front of the engine.

The propfan engine may further comprise an outer wall 130, e.g. nacelle, comprising an outer profile 132. The outer wall 130 may comprise one or more constituent elements. For example, first and second elements 130a, 130b may form a fixed, e.g. non-rotating, portion of the outer wall upstream of the first and second rotors 110, 120. The first element 130a may comprise an inlet cowl and the second element 130b may comprise one or more access doors. Third and fourth elements 130c, 130d downstream of the first and second elements 130a, 130b may rotate with respect to the fixed first and second elements 130a, 130b. The rotors of the first rotor stage 110 may connect to the third element 130c and the rotors of the second rotor stage 120 may connect to the fourth element 130d. The third and fourth elements 130c, 130d and hence first and second rotor stages 110, 120 may rotate in opposite directions. Although not shown, in an alternative example, a non-rotating intermediate element may be provided between the third and fourth elements 130c, 130d. A fifth element 130e of the outer wall 130 may be provided downstream of the third and fourth elements 130c, 130d. The fifth element 130e may be rotating or fixed, e.g. non-rotating, and the exhaust from the engine may be emitted between the fourth and fifth elements 130d, 130e.

The outer wall 130, at least in part, may form a body of revolution about a longitudinal axis 140. Accordingly, at least a portion of the outer profile 132 may define a substantially circular cross-section. For example, at least the third and fourth elements 130c, 130d of the outer wall 130 may be substantially circular in cross-section. Furthermore, at least portions of the remaining elements 130a, 130b, 130e may also be circular in cross-section.

Downstream of a leading edge 112 of the first stage rotors 110, the diameter of the outer profile 132 may increase in the direction of flow over the outer wall 130c. The diameter may increase at all points at substantially all points defining the circumference of the substantially circular cross-section. In effect, the diameter increase presents the flow with a "blockage" 116. The blockage 116 may serve to reduce the flow velocities upstream of the blockage, e.g. through the rotor stage, and hence mitigate the aforementioned issues.

Either or each of the first and second rotor stages 110, 120 may have associated with it an increase in the diameter of the outer profile 132 downstream of the respective rotor leading edges 112, 122, e.g. each rotor stage may have a downstream blockage 116, 126. For example, downstream of a leading edge 122 of the second stage rotors 120, the diameter of outer profile 132 may also increase in the direction of flow over the outer wall 130d. There may be a reduction in the diameter of the outer profile 132 between the blockage 116 of the first rotor stage 110 and the blockage 126 of the second rotor stage 120.

The diameter may start increasing at a point upstream of a trailing edge 113, 123 of the rotors. In other words, the downstream blockage 116, 126 may start upstream of the rotor trailing edge 113, 123. However, the blockage 116, 126 may start downstream of the rotor trailing edge, e.g. particularly if the peak flow Mach number over the outer wall 130 would otherwise occur within the rotor blade passage, i.e. between the rotor leading and trailing edges.

The cross-section of the outer profile 132 may comprise a maximum diameter 134 at a point upstream of a leading edge 112 of the first stage rotors 110. In addition or instead of the aforementioned blockage, the diameter of the cross-section may reduce between the maximum diameter 134 and the leading edge of the rotors 112. The outer profile 132 may comprise a point of inflection 135 between the maximum diameter 134 and the leading edge 112 of the rotors. In effect, the diameter reduction diffuses the flow velocity and may be referred to as a "diffusion". The diffusion may serve to reduce the flow velocities through the rotor stages and hence mitigate the aforementioned issues. The point of inflection 135 serves to provide a rapid, yet smooth, reduction in the diameter, thereby maximising the diffusion and the resulting benefits.

Either or each of the first and second rotor stages 110, 120 may have associated with it a reduction in the diameter of the outer profile 132 upstream of the respective rotor leading edges 112, 122, e.g. an upstream diffusion 114, 124. For example, the outer profile 132 may also comprise a point of inflection 137 between a maximum diameter 136 and the leading edge 122 of the second stage rotors 120. The maximum diameter may be an overall maximum diameter 134, e.g. in the case of the first rotor stage 110, or it may be a local maximum diameter 136, which may be different from overall maximum diameter, e.g. in the case of the second rotor stage 120. Alternatively, the maximum diameter 134 may be a local maximum and the maximum diameter 136 may be an overall maximum.

The reduction in the diameter between the maximum diameter 134, 136 and the leading edge 112, 122 of the rotors may finish substantially in line with the leading edge of the rotors. In other words, the upstream diffusion 114, 124 may finish in line with the rotor leading edges 112, 122. Furthermore, the amount of diffusion, e.g. reduction in diameter, ahead of the first rotor stage 110 may be limited to avoid a large increase to the nacelle maximum diameter 134. This may benefit the rotor efficiency by reducing the freestream over-speed otherwise experienced in the tip region of the rotors.

In summary the outer profile 132 of the outer wall 130 may comprise a conventional forebody to the maximum diameter point 134 and beyond which the outer wall may comprise one or more of the following: a diffusion 114 ahead of the first rotor stage 110, a blockage 116 downstream of the first rotor stage 110, a diffusion 124 ahead of the second rotor stage 120 and a blockage 126 downstream of the second rotor stage 120.

With reference to FIG. 2(b) one or each of the blockages 116, 126 may comprise one or more constituent parts in the outer wall profile 132. For example, the diameter of the outer profile may increase at an increasing rate in a first part 116a, 126a of the blockage and the diameter may increase at a decreasing rate in a second part 116b, 126b of the blockage, e.g. downstream of the first part. For example, the first part 116a, 126a may be at least partially concave and the second part 116b, 126b may be at least partially convex, e.g. with respect to the longitudinal axis 140. Accordingly, there may be a point of inflection 117, 127 in the outer wall profile between the first and second parts of the blockage.

One or each of the blockages 116, 126 may comprise a third part 116c, 126c in which the diameter of the outer wall reduces. The third part 116c, 126c may be downstream of the second part 116b, 126b. For example, the third part 116c, 126c of the blockage may be at least partially convex, e.g. with respect to the longitudinal axis 140. Accordingly, there may be a maximum 136 in the diameter of the outer profile 132 between the third part 116c and the second part 116b of the blockage 116 and a maximum 138 in the diameter of the outer profile 132 between the third part 126*c* and the second part 126*b* of the blockage 126.

One or each of the diffusions 114, 124 may also comprise one or more constituent parts in the outer wall profile 132. For example, the diameter of the outer profile may reduce at an increasing rate in a first part 114*a*, 124*a* of the diffusion and the diameter may reduce at a decreasing rate in a second part 114*b*, 124*b* of the diffusion, e.g. downstream of the first part. For example, the first part 114*a*, 124*a* may be at least partially convex and the second part 114*b*, 124*b* may be at least partially concave, e.g. with respect to the longitudinal axis 140. Accordingly, there may be a point of inflection 135, 137 in the outer wall profile between the first and second parts of the diffusion.

The third part 116*c* of the blockage 116 for the first rotor stage 110 may correspond to the first part 124*a* of the diffusion 124 for the second rotor stage 120.

The nacelle profile may comprise the following curvatures for a typical 0.75 cruise Mach number. The radius of curvature in the first part 116*a*, 126*a* of the blockage 116, 126 may be approximately 20% of the overall maximum diameter 134 of the propfan outer wall. The radius of curvature in the second part 116*b*, 126*b* of the blockage 116, 126 may be approximately 40% of the maximum diameter 134 of the propfan outer wall. The radius of curvature in the third part 116*c*, 126*c* of the blockage 116, 126 may be approximately 40% of a maximum diameter 134 of the propfan outer wall. The second and third parts of the blockage 116, 126 may have the same radii of curvature. The radius of curvature in the first part 114*a*, 124*a* of the diffusion 114, 124 may be approximately 130% of the overall maximum diameter 134 of the propfan outer wall. The radius of curvature in the second part 114*b*, 124*b* of the diffusion 114, 124 may be approximately 25% of the maximum diameter 134 of the propfan outer wall.

Referring to the pusher configuration of FIG. 2, the blockage has an average gradient of around 7.5° with respect to the longitudinal axis between a local minimum diameter 150 and the local maximum diameter 136. That is to say, the gradient of a notional line extending between the minimum diameter 150 and local maximum diameter 136 has a gradient of around 7.5° with respect to the longitudinal axis. More generally, the average gradient for a typical 0.75 cruise Mach number will be between 6° and 9°. The increase in diameter of the substantially circular cross section portion from the local minimum diameter to the local maximum diameter is between 4% and 6% of the maximum diameter.

Again referring to the pusher configuration of FIG. 2, the diffusion has an average gradient between the maximum diameter 134 and the local minimum diameter 150 of substantially 6°. More generally, the gradient will be between 5° and 9° for a typical 0.75 cruise Mach number. The reduction in diameter of the diffusion is 8%, and more generally will be between 7% and 9% of the maximum diameter for a typical 0.75 cruise Mach number.

For higher cruise speeds the radius of curvature for the first part 114*a*, 124*a* of the diffusion 114, 124 may need to be increased from 130% of the overall maximum diameter, for example to avoid excessive flow Mach numbers on the outer wall and the associated wave drag.

Figure 3:
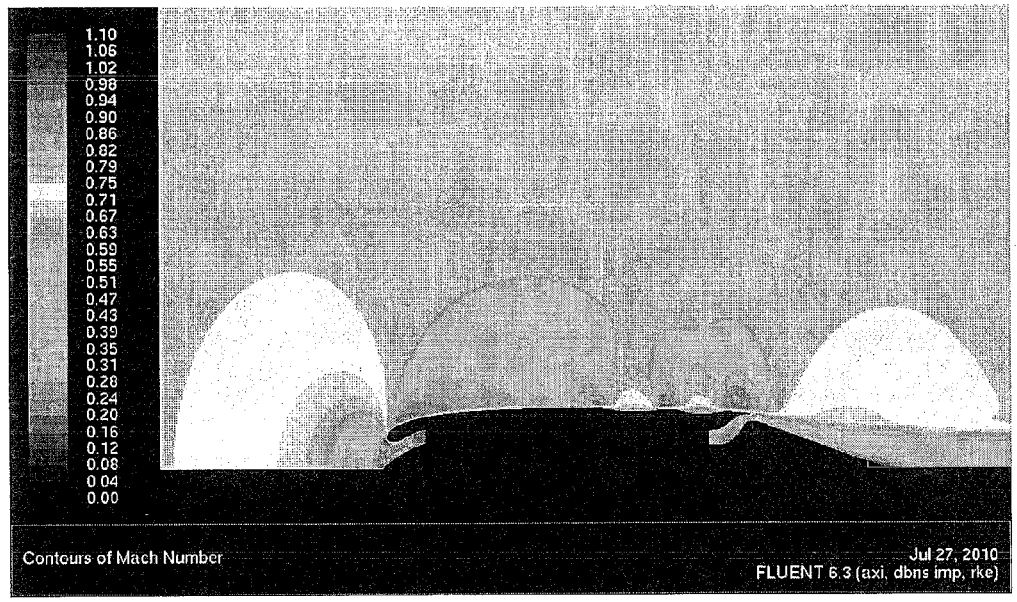
FIG. 3 shows contours of Mach number for a flow around the diffusive nacelle shown in FIG. 2.

With reference to FIG. 3, contours of the flow Mach number around the outer wall profile are shown. FIG. 3 shows how the nacelle profile can be used to create reductions in the Mach number in the region of the rotor blade hubs. The controlled diffusion ahead of each rotor stage and/or the downstream blockage have a significant benefit in reducing the local axial Mach number in the mid span and hub region of the rotors. The local reduction in axial Mach number helps to improve rotor efficiency and also helps eliminate any choking through the root of the blade. (The thickness of the blade in the root region creates a blockage, which can lead to high shock losses at a critical inlet relative Mach number). Given a set number of blades, rotational speed, flight Mach number and a root thickness for mechanical considerations, the local axial Mach number can be adjusted with the nacelle profiling of the present invention to avoid root choking and shock losses in the blade passage.

Figure 4:
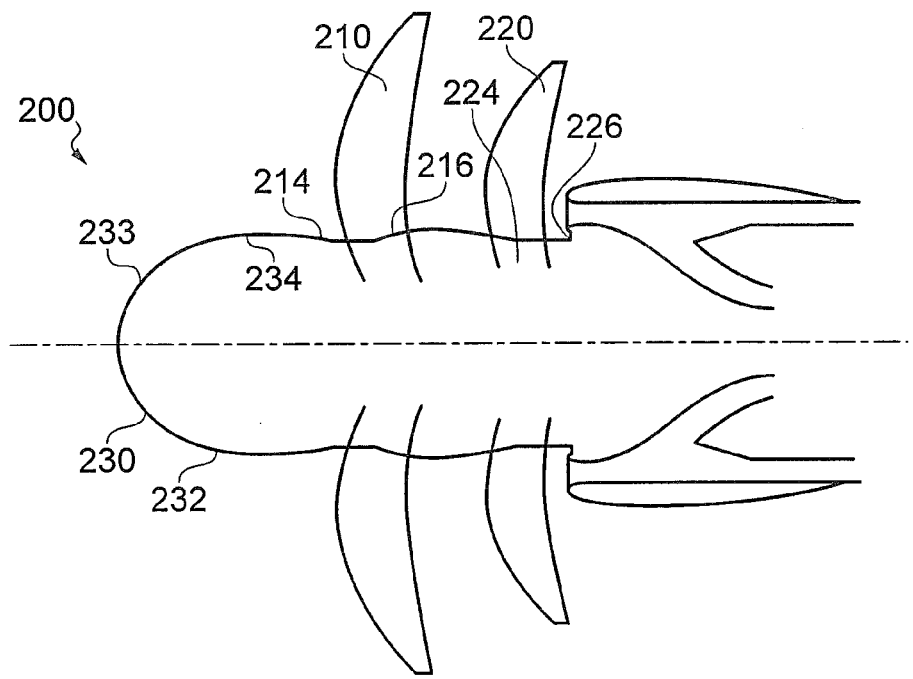
FIG. 4 shows a sectional view of a diffusive nacelle according to a further example of the present disclosure.

With reference to FIG. 4, the outer profile of the present invention may equally be applied to a puller type propfan engine 200. For example, the outer profile 232 of the outer wall 230 may comprise a conventional forebody 233 to the maximum diameter point 234 and beyond which the outer wall may comprise one or more of the following: a diffusion 214 ahead of the first rotor stage 210, a blockage 216 downstream of the first rotor stage, a diffusion 224 ahead of the second rotor stage 220 and a blockage 226 downstream of the second rotor stage. The shapes and configurations of the blockages and the diffusions for the puller type propfan engine may correspond to the blockages and diffusions described with reference to the pusher type propfan shown in FIG. 2.

For to the puller configuration of FIG. 4, the blockage has an average gradient of around 11° with respect to the longitudinal axis between a local minimum diameter 250 and a local maximum diameter 236. That is to say, the gradient of a notional line extending between the minimum diameter 250 and local maximum diameter 236 has a gradient of around 11° with respect to the longitudinal axis. More generally, the average gradient for a typical 0.75 cruise Mach number will be between 10° and 12°. The increase in diameter of the substantially circular cross section portion from the minimum diameter to the maximum diameter is between 11% and 13% of the maximum diameter.

Again referring to the puller configuration of FIG. 4, the diffusion has a average gradient between the maximum diameter 236 and the local minimum 250 of substantially 6°. More generally, the gradient will be between 5° and 9° for a typical 0.75 cruise Mach number. The reduction in diameter of the diffusion is 7% and more generally will be between 6% and 8% of the maximum diameter for a typical 0.75 cruise Mach number The external nacelle cowl profile disclosed herein helps improve rotor performance and avoids root choke issues. This in turn may permit one or more of higher flight Mach number, lower rotor hub to tip ratio, higher blade count and increased blade root structural thickness. The improved flow field may also facilitate higher mechanical integrity and/or permit reduced rotor blade chord and weight. Furthermore, the improved flow field through the hub allows the optimum blade count to be selected for a low noise solution.

The proposed upstream diffusive curvature and downstream blockage help to maximize rotor efficiency gains for minimum impact on nacelle drag and weight. The profile avoids excessive increases to the upstream nacelle maximum diameter as otherwise experienced by the prior art GE36 propfan. The improved rotor flow field of the present invention gives a larger performance improvement than the prior art diffusion ahead of the rotors. For example, a 1.5-2% improvement in the specific fuel consumption is predicted for the profiled nacelle of the present invention and this includes accounting for any increases in nacelle weight and drag.

Furthermore, in the case of a puller type propfan, the outer wall profile of the present invention helps to minimise the upstream spinner length and diameter, and avoids increases to the downstream nacelle diameter.

The blockage downstream of each rotor may be more effective than the upstream diffusion at reducing the rotor hub flow speeds. Equally, the diffusion upstream of each rotor may be more effective than the downstream blockage at reducing the flow speeds. Therefore the outer wall profile may comprise any combination of the downstream blockage and the upstream diffusion for one or both of the rotor stages. For example, one or more of the rotor stages of the propfan engine may comprise a downstream blockage with no upstream diffusion (e.g. plain nacelle forebody). In other words, the propfan engine may comprise a blockage between the first and second rotors, a blockage downstream of the second rotor only or a blockage downstream of both the first and second rotors. Alternatively or additionally, one or more of the rotor stages of the propfan engine may comprise an upstream diffusion with or without downstream blockage. In other words, the propfan engine may comprise a diffusion between the first and second rotors, a diffusion upstream of the first rotor only or a diffusion upstream of both the first and second rotors.

The invention claimed is:

1. A propfan engine comprising:
    one or more rotor stages comprising a plurality of rotors; and
    an outer wall comprising an outer profile, at least a portion of the outer profile comprising a substantially circular cross-section, wherein
    the diameter of the substantially circular cross-section increases in the direction of flow over the outer wall and downstream of a leading edge of the rotors, and the diameter increases at substantially all points defining the circumference of the substantially circular cross-section, wherein the diameter increases at an increasing rate in a first part of the portion of the outer profile, and the diameter increases at a decreasing rate in a second part of the portion of the outer profile.

2. The propfan engine of claim 1, wherein the second part is downstream of the first part of the portion of the outer profile and there is a point of inflection in the outer profile between the first and second parts of the portion of the outer profile.

3. The propfan engine of claim 1, wherein the radius of the curvature in the first part of the portion of the outer profile is substantially 20% of a maximum diameter of the propfan outer wall.

4. The propfan engine of claim 1, wherein in a third part of the portion of the outer profile the diameter of the substantially circular cross-section reduces in the direction of flow over the outer wall.

5. The propfan engine of claim 4, wherein the radius of the curvature of the second and/or third parts of the portion of the outer profile is in the range of substantially 40% to substantially 130% of a maximum diameter of the propfan outer wall.

6. The propfan engine of claim 1,
    wherein in a third part of the portion of the outer profile the diameter of the substantially circular cross-section reduces in the direction of flow over the outer wall, and
    wherein the third part is downstream of the first part and/or second part of the portion of the outer profile and there is a local maximum in the cross-section diameter in the outer profile between the third part and the first and/or second parts of the portion of the outer profile.

7. The propfan engine of claim 6, wherein the radius of the curvature of the second and/or third parts of the portion of the outer profile is in the range of substantially 40% to substantially 130% of a maximum diameter of the propfan outer wall.

8. The propfan engine of claim 2, wherein the radius of the curvature of the second and/or third parts of the portion of the outer profile is substantially 40% of a maximum diameter of the propfan outer wall.

9. The propfan engine of claim 2, wherein the radius of the curvature of the second and/or third parts of the portion of the outer profile is substantially 40% of a maximum diameter of the propfan outer wall.

10. The propfan engine of claim 1, wherein the diameter of the substantially circular cross-section starts to increase upstream of a trailing edge of the rotors.

11. The propfan of claim 1, wherein a cross-section of the outer profile comprises a maximum diameter at a point upstream of a leading edge of the rotors, the diameter reducing between the maximum diameter and the leading edge of the rotors, and wherein the outer profile comprises a point of inflection between the maximum diameter and the leading edge of the rotors.

12. The propfan of claim 1, wherein the propfan engine comprises a first rotor stage and a second rotor stage, each rotor stage having associated with it an increase in the diameter of the substantially circular cross-section downstream of the respective rotor leading edges.

13. A propfan engine comprising:
    one or more rotor stages comprising a plurality of rotors; and
    an outer wall comprising an outer profile, the outer profile defining a cross-section, wherein
    the cross-section of the outer profile comprises a maximum diameter at a point upstream of a leading edge of the rotors, the diameter reducing between the maximum diameter and the leading edge of the rotors, and wherein the outer profile comprises a point of inflection between the maximum diameter and the leading edge of the rotors.

14. The propfan engine of claim 13, wherein the reduction in the diameter between the maximum diameter and the leading edge of the rotors finishes substantially in line with the leading edge of the rotors, and a first part of the reduction in the diameter between the maximum diameter and the leading edge of the rotors reduces at an increasing rate.

15. The propfan engine of claim 14, wherein the first part of the reduction in the diameter between the maximum diameter and the leading edge of the rotors comprises a radius of curvature substantially 130% of the maximum diameter of the propfan outer wall.

16. The propfan engine of claim 13, wherein a second part of the reduction in the diameter between the maximum diameter and the leading edge of the rotors reduces at a decreasing rate, and the reduction in the diameter between the maximum diameter and the leading edge of the rotors comprises a radius of curvature substantially 25% of the maximum diameter of the propfan outer wall.

17. A propfan engine comprising:
    one or more rotor stages comprising a plurality of rotors; and
    an outer wall comprising an outer profile, at least a portion of the outer profile comprising a substantially circular cross-section, wherein
    the diameter of the substantially circular cross-section increases in the direction of flow over the outer wall and downstream of a leading edge of the rotors, and the diameter increases at substantially all points defining the circumference of the substantially circular cross-section, wherein a cross-section of the outer profile comprises a maximum diameter at a point upstream of a leading edge of the rotors, the diameter reducing between the maximum diameter and the leading edge of the rotors, and wherein the outer profile comprises a point of inflection between the maximum diameter and the leading edge of the rotors.

* * * * *